United States Patent [19]
Galdun et al.

[11] Patent Number: 5,809,334
[45] Date of Patent: Sep. 15, 1998

[54] RECEIVE PACKET PRE-PARSING BY A DMA CONTROLLER

[75] Inventors: Daniel J. Galdun, Huntsburg; Peter J. Boldt, W. Farmington, both of Ohio

[73] Assignee: Allen-Bradley Company, LLC, Milwaukee, Wis.

[21] Appl. No.: 710,891

[22] Filed: Sep. 24, 1996

[51] Int. Cl.⁶ .................................................. G06F 13/32
[52] U.S. Cl. ........................ 395/842; 395/733; 395/868
[58] Field of Search ..................... 395/733, 842, 395/868, 182.04, 182.19

[56] References Cited

U.S. PATENT DOCUMENTS

| | | | |
|---|---|---|---|
| 5,210,749 | 5/1993 | Firoozmand | 370/463 |
| 5,247,519 | 9/1993 | Snowden et al. | 370/313 |
| 5,301,287 | 4/1994 | Herrell et al. | 711/202 |
| 5,335,335 | 8/1994 | Jackson et al. | 711/121 |
| 5,530,902 | 6/1996 | McRoberts et al. | 395/842 |
| 5,539,917 | 7/1996 | Jirgal | 395/842 |
| 5,559,801 | 9/1996 | Lo | 370/412 |
| 5,644,787 | 7/1997 | Nakamura et al. | 395/853 |

*Primary Examiner*—Ayaz R. Sheikh
*Assistant Examiner*—Ario Etienne
*Attorney, Agent, or Firm*—Mark S. Svat; John M. Miller; John J. Horn

[57] ABSTRACT

A processor-based control system including a host processor, a data receiver device, a system memory, and an intelligent DMA controller. The DMA controller includes a pre-parsing section. The pre-parsing section interrogating a received data packet to determine whether the received data packet contains an error, is valid, is a null packet or whether the host processor must be contacted.

17 Claims, 7 Drawing Sheets

RECEIVE PACKET PRE-PARSING BY A DMA CONTROLLER

BACKGROUND OF THE INVENTION

The present invention is directed to the sending and receiving of data packets in a processor based control system employing a multi-channel intelligent DMA controller, and more particularly using the DMA controller to determine the status and further processing of received data packets.

In control systems, external data is received by a receiving device, such as a media access interface chip, which in the following may be called a System Media Access Controller (SMAC), this data is passed to a DMA controller which, acting in cooperation with a host processor, stores the received data in a system memory thereby providing the host processor with access to this data for further processing.

In existing control systems the host processor is responsible for servicing all interrupts from the receiving device requiring it to deal with all received data packets including good packets, null packets or packets which contain errors. Though capable of being handled by the host processor, the act of being interrupted, processing the interrupt, and acknowledging the interrupt severely burdens the control system to the point that the system may not be able to function at desired operational speeds.

Therefore, it has been deemed desirable to develop a control system using an intelligent multi-channel DMA controller which pre-parses received data packets to determine whether the packets are good packets, null packets or packets containing an error and which then passes the status of the pre-parsed data packets to the host processor. By this construction, the host processor receives required data without needing to service each interrupt from the receiving device.

SUMMARY OF THE INVENTION

In accordance with the present invention, a processor based control system includes a receiving device which receives external data, which is passed to an intelligent multi-channel DMA controller working in cooperation with a host processor to store received data in system memory. The receiving device interrupts the DMA controller signalling that there is no more data to move. The DMA controller then interrogates the receiving device to determine the disposition of a received data packet. Particularly, the DMA controller determines whether the received packet is a good packet, a null packet, or a packet containing an error. By this construction, the number of interrupts which must be handled by the host processor are greatly reduced.

In a more limited aspect of the present invention, the DMA controller automatically marks a received data packet as good or bad and passes the data packet and status to the host processor.

An advantage of the present invention is that the host processor is not burdened with interrupts for actions not requiring host processor intervention.

Another advantage of the present invention is that the number of connections and the communication rate specified for the control system does not have to be restricted due to a burden on the host processor existing because of the servicing of interrupts.

A further advantage of the present invention is that the communication system can be constructed without the use of high speed components thus reducing product cost and increasing the speed at which the control system may be developed.

Further advantages of the subject invention will become apparent to one of ordinary skill in the art upon a reading and understanding of the subject specification.

BRIEF DESCRIPTION OF THE DRAWINGS

This invention may take physical form in certain parts and arrangements of parts, or the practice of certain steps, a preferred embodiment of which will be described in detail in this specification and illustrated in the accompanying drawings which form a part hereof and wherein.

DETAILED DESCRIPTION OF THE PREFERRED EMBODIMENT

Figure 1A:
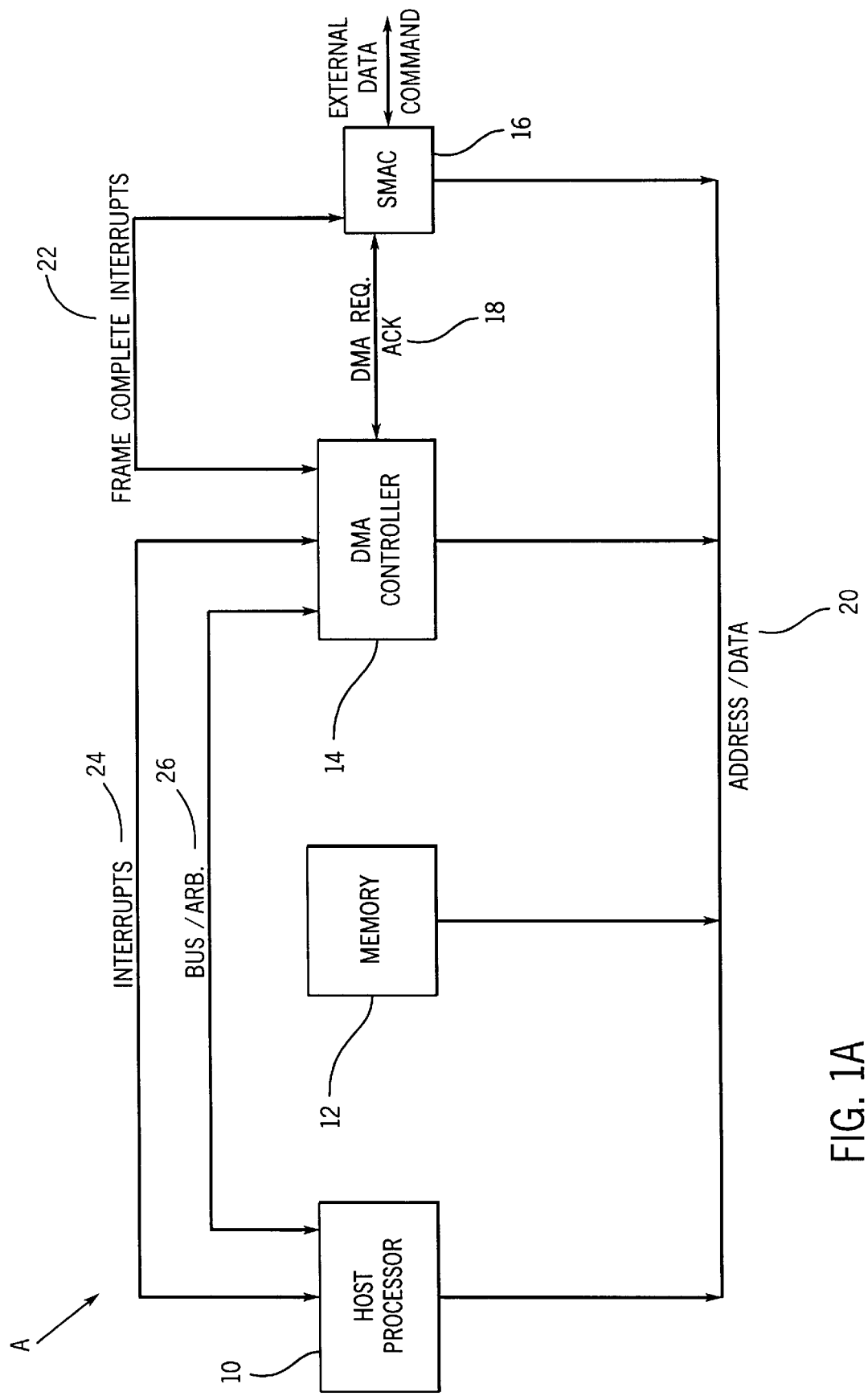
FIG. 1A is a block diagram of a control system according to the subject invention.

Referring now to the drawings which are provided for the purpose of illustrating the preferred embodiment of the invention only, and not for the purpose of limiting the same, FIG. 1A is a block diagram of control system A according to the subject invention. Control system A includes host processor 10, system memory 12, DMA controller 14, and receiver device, such as an ASIC (Applicant Specific Integrated Circuit) SMAC (System Media Access Controller), 16. While not intending to limit the subject invention, in the present embodiment host processor 10 may be one of a variety of microprocessors including a Motorola CPU 32 compatible host, 68340. Further, a PAC1000 programmable peripheral controller manufactured by WaferScale, Inc. of Freemont, Calif. is the platform on which DMA controller 14 is based.

With attention to control system A, externally generated data is received by SMAC 16 from sensors, monitors, other control systems, etc. (not shown). SMAC 16 is provided with an internal buffer for holding a limited amount of the received data. When SMAC 16 receives data in its internal buffer it issues a signal to DMA controller 14, via DMA request/acknowledgement bus 18, to move the data from the SMAC's internal buffer into system memory 12.

Data is moved from SMAC 16 to system memory 12 by DMA controller 14 in a predetermined range of data packet sizes across address/data bus 20. This direct memory access by DMA controller 14 occurs in a maximum of 4-word groups. The basic amount of a data transfer operation from SMAC 16 to DMA controller 14 is a MAC frame, which is configured to contain multiple data packets. The received data is stored in a buffer memory area of system memory 12. When a complete MAC frame has been transferred from SMAC 16 to DMA controller 14 a frame complete interrupt is issued on frame complete line 22 to DMA controller 14.

Following storage of the moved data, interrupts are sent via bus 24 from DMA controller 14 to host processor 10 informing host processor 10 that received data is available for processing in system memory 12. Bus/arbitration signals are provided on bus 26 between DMA controller 14 and host processor 10 to control various functions of control system A.

DMA controller 14 of the subject invention is configured as an intelligent three channel DMA controller to handle, transmit and receive streams of data from and to SMAC 16. DMA controller 14 also requests mastership of host processor bus 26 when one of the DMA channels needs access to system memory 12.

The three DMA channels of DMA controller 14 provide three independent buffer chaining DMA channels to service internal data streams of SMAC 16. Two of the channels are transmit channels and one is a receive channel used to transfer transmit data from system memory 12 to SMAC 16 and transfer received data from SMAC 16 to system memory 12. While the present discussion focuses on a three channel DMA controller it is to be appreciated the invention can be implemented using DMA controllers with more or less channels.

DMA controller 14 is interruptable by SMAC 16 and is capable of accessing internal registers of SMAC 16 to interrogate and acknowledge interrupts. DMA controller 14 is designed to use SMAC's implicit mode of DMA transfer and its independent DMA channels are configured by a combination of internal registers, set by host processor 10 through FIFO registers of DMA controller 14, and buffer chaining configuration information placed in system memory 12 by host processor 10.

DMA controller 14 interfaces with SMAC 16 via the request and acknowledge bus 18 and signals from this bus are used to inform DMA controller 14 that SMAC 16 either has data to transfer to system memory 12, or that SMAC 16 has room in its internal buffer to transmit data. DMA controller 14 interfaces with host processor 10 via host address, data and control bus 26 after obtaining bus mastership. Host processor 10 uses this interface to configure the DMA channels by commands and data written to the registers of DMA controller 14. Host processor 10 also sets up buffer structures in system memory 12 to control the DMA-ing process. DMA controller 14 uses the interface with host processor 10 to access the data buffers and buffer descriptors. A buffer descriptor being a three word identification block composed of a descriptor status and control word, a word containing the actual length of the data buffer, and a pointer to the start of the data buffer holding information.

Figure 1B:
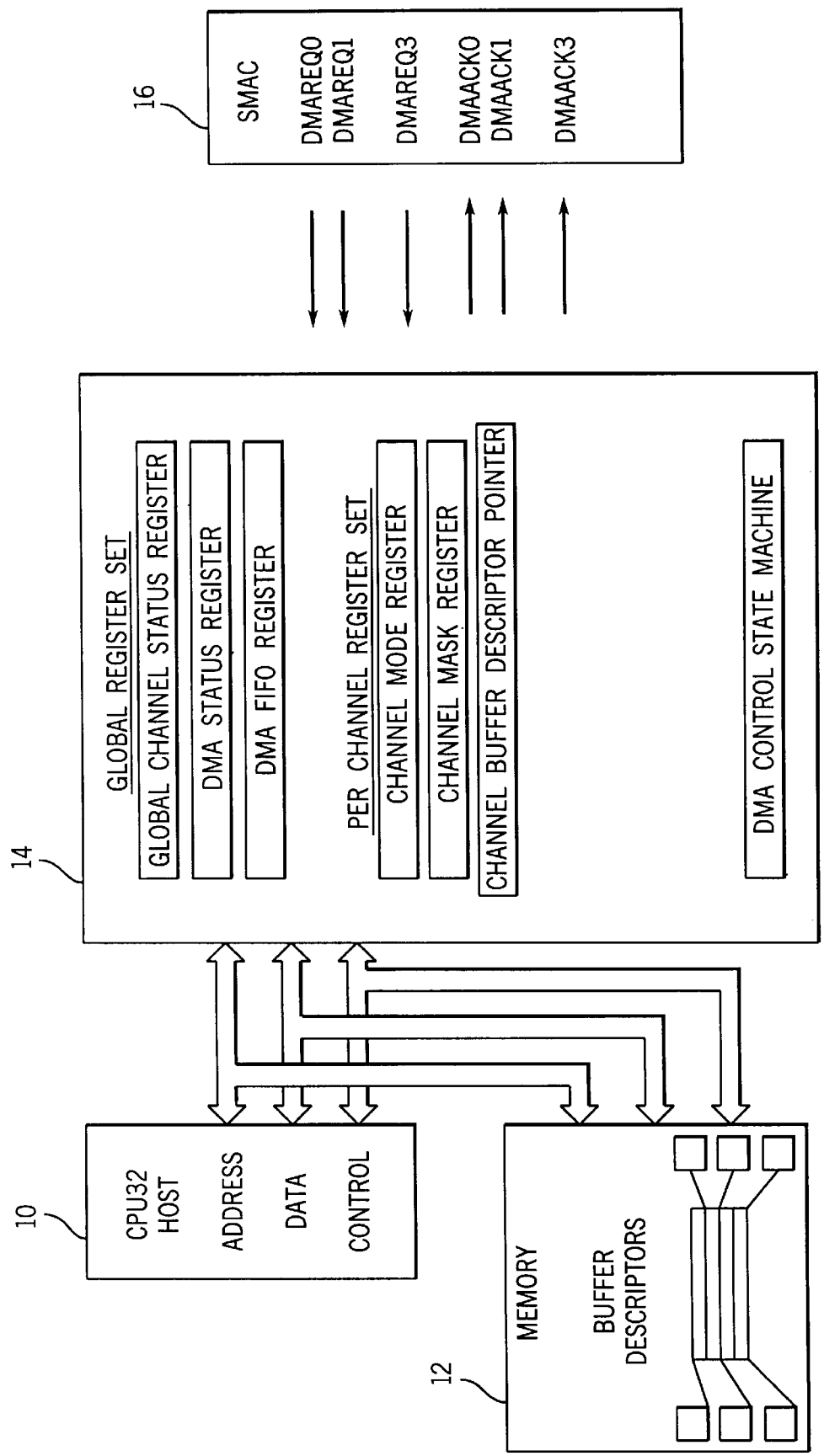
FIG. 1B is a block diagram of a DMA controller used in the control systems.

FIG. 1B sets forth a more detailed view of the configuration of a DMA controller 14, illustrating that DMA controller 14 includes a Global Register Set including a Global Channel Status Register, a DMA Status Register, and a DMA FIFO Register. Further, a Channel Register Set is provided for each DMA channel, including a Channel Mode Register, a Channel Mask Register, a Channel Buffer Descriptor Pointer Register, and a DMA Control State Machine Register.

DMA controller 14 supports an implicit mode of transfer of SMAC 16 and manages the DMA process through a buffer chaining mechanism. Host processor 10 configures DMA channels via FIFO commands and data written to DMA controller 14, and by setting up the appropriate buffer descriptors. Host processor 10 then starts DMA controller 14 via Channel Mode Register. Once DMA controller 14 is started by host processor 10, DMA controller 14 automatically services DMA requests from SMAC 16 by sequentially processing a buffer descriptor ring. Under normal operation a user configures buffer descriptors and channel registers for each DMA channel before network start-up.

In such an implementation, the operation of each DMA channel is controlled by its internal configuration registers. The Channel Mode Register is used to configure mode information for DMA operations. The Global Channel Status Register, is used to provide information to host processor 10 regarding all of the DMA channels at a single time, where host processor 10 examines individual bits in a received status word to determine a status of each individual channel. The Channel Mask Register, is used to inform DMA controller 14 that host processor 10 needs to be interrupted whenever a corresponding control signal in the Global Channel Status Register, is set.

Each DMA channel retains a Channel Buffer Descriptor Pointer Register which is a 16-bit register holding the address of the start of the buffer descriptor list in memory for a particular channel.

Global Channel Status Register can only be read by host processor 10. In addition, the internal status of DMA controller 14 can be read by host processor 10 from another read only register, wherein the read status word contains DMA controller 14 FIFO information. All other channel register actions are done via a command string written to the FIFO register of DMA controller 14.

Controller Status Register contains the internal status of DMA controller 14, which may only be read. Of particular interest to host processor 10 is the FIFO status register bit, which when set indicates to host processor 10 that there is at least one vacant location in FIFO.

Lastly, DMA Controller Status Machine Register indicates the present status of DMA controller 14.

Data associated with a DMA channel is stored in data buffers configured from system memory 12. Each data buffer is referenced by a buffer descriptor which in one embodiment is 48-bits in length and contains a status and control word, a data buffer word and a pointer to its associated data buffer. The buffer descriptors are formed as a list structure in system memory 12 whereby a data buffer chain is formed. Such a chaining is illustrated generally in FIG. 1C. Host processor 10 sets up a buffer descriptor list for a particular DMA channel before starting that DMA channel. The DMA channel then begins processing buffer descriptors until the DMA process is halted either by host processor 10 setting a stop channel bit in Channel Mask Register, DMA controller 14 encountering a last bit set in a buffer descriptor, or a hardware or software reset.

The DMA channel pauses and waits for buffer descriptors to be updated when it encounters a buffer descriptor with a valid bit not set in the status and control word. When host processor 10 is ready for a DMA channel to again start and the current buffer descriptor has been validated, host processor 10 invokes a buffer descriptor update command for the channel to inform DMA controller 14 that the buffer descriptors have been updated and should be re-read.

Figure 1C:
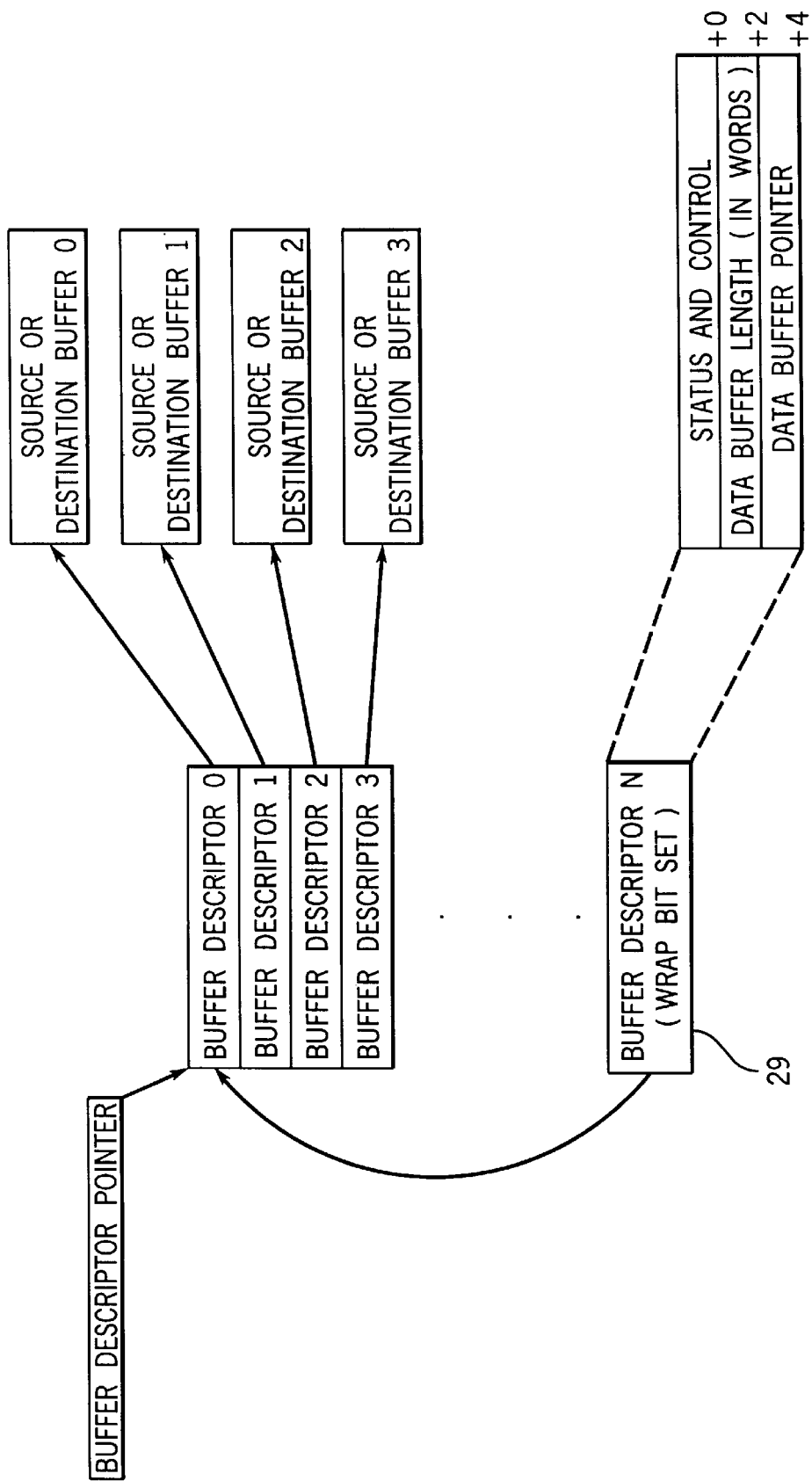
FIG. 1C illustrates the chaining of buffer descriptors.

As previously discussed, the buffer descriptors contain three fields, the status and control word, the data length word and a pointer to the data buffer. As illustrated in FIG. 1C, buffer descriptors 0–n are constructed in a chained type arrangement. A wrap bit 29 indicates to DMA controller 14 whether or not a current buffer descriptor is the final one in the physical list and the process should be wrapped around to the first buffer descriptor in the list. Wrap bit 29 is set by host processor 10 in the final descriptor of buffer descriptor ring 0–n.

Whereas system memory 12 can be configured to include a plurality of predetermined sized data buffers, it is also possible to dynamically fracture a single memory buffer into smaller memory fragments for storing received data. Such a system is described in U.S. patent application Ser. No. 08/664,967 entitled, Dynamic Buffer Fracturing by a DMA Controller, by the present inventors and commonly assigned, whose contents are fully incorporated herein.

Figure 2:
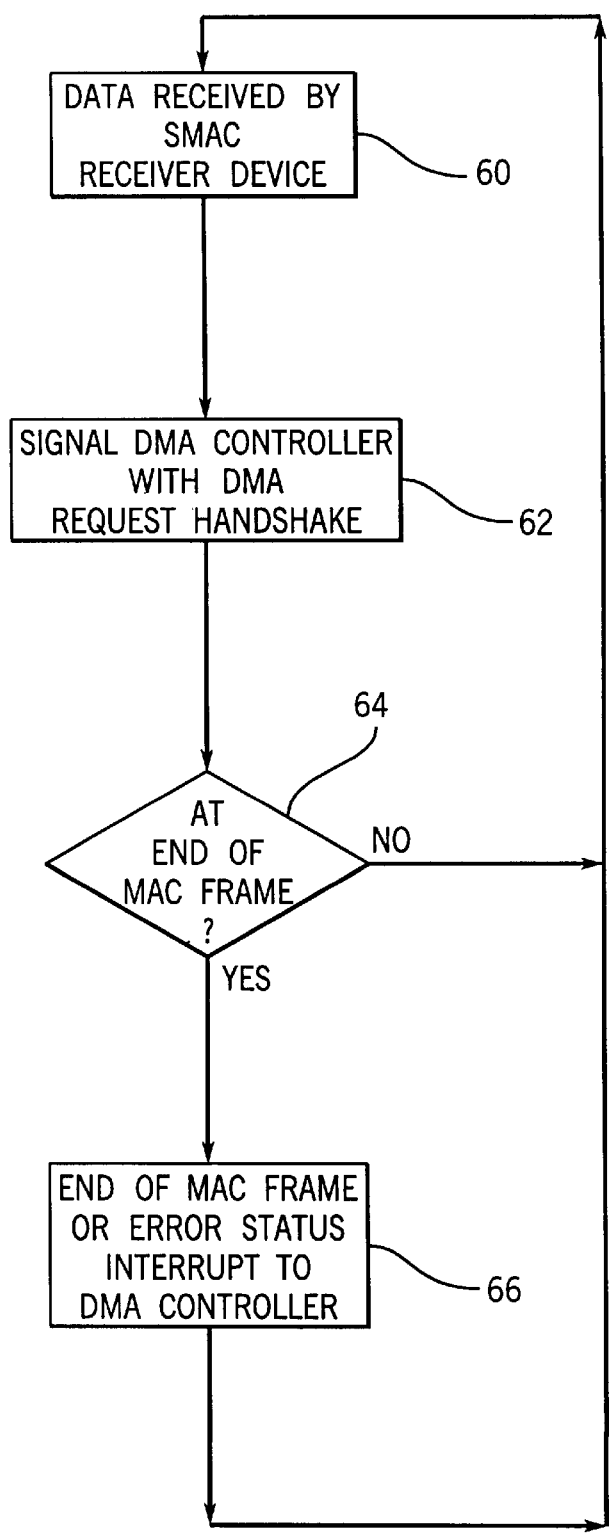
FIG. 2 is a flow chart of data being received by a receiving device of the control system.

With attention to FIG. 2, the process of receiving data by the receiving device or SMAC 16 is illustrated. Initially, data is received by the SMAC receiving device 60. The SMAC then signals DMA controller 14 with a DMA request handshake 62. Next, an inquiry is made as to whether a complete MAC frame has been transferred 64. If it is determined that the processing is not at the end of a MAC frame the process returns to block 60. When it is determined that the process is at the end of a MAC frame, control is moved to block 66 which either acknowledges the end of the MAC frame or sends an error status interrupt to the DMA controller.

Figure 3:
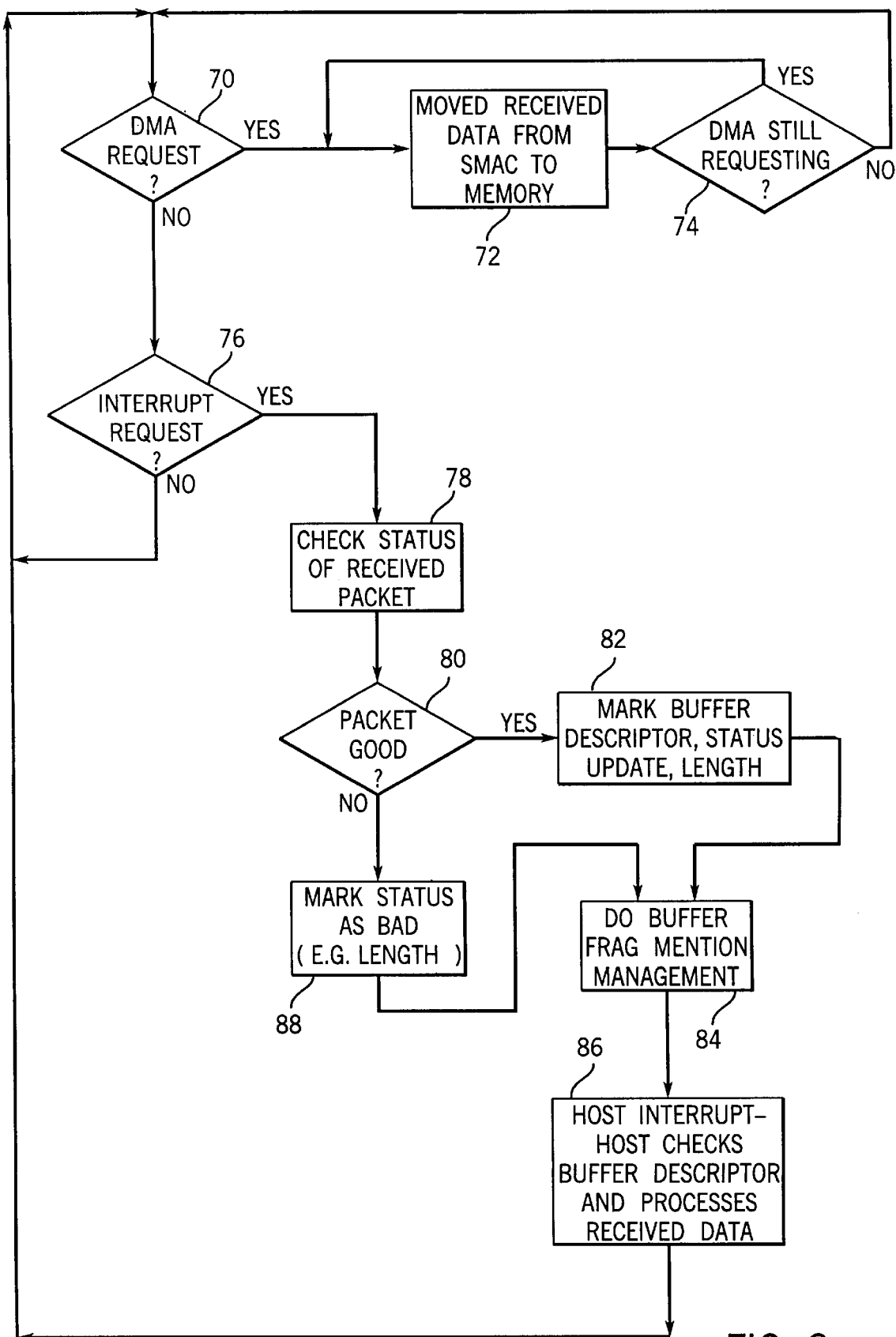
FIG. 3 is a flow chart illustrating the operation of a DMA controller according to the subject invention.

FIG. 3 sets forth a general operational flow of data which has been received by receiving device 16. In this process a determination is made of whether the DMA controller has received a request 70. If a request has been received from the SMAC, data is moved from the SMAC to system memory 72. A determination is next made as to whether DMA requests are still being processed 74. When DMA requests are still being processed control is returned to block 72, however, if a DMA request is no longer being made control is transferred to block 70 to investigate whether a new DMA request is issued. When no DMA request is issued, a determination is made whether an interrupt request has been provided to the DMA controller 76. If no interrupt request is made, process control returns to block 70.

Upon issuance of an interrupt request, a check of the status of a received data packet 78 is undertaken to decide if the data packet is acceptable 80. When the data packet is found to be acceptable, control passes to block 82 to mark the buffer descriptor status, and to update the length of the received data. Next, buffer fragmentation management 84 is undertaken by the DMA controller, the steps of this buffer fragmentation is detailed in the incorporated patent application Dynamic Buffer Fracturing by a DMA controller. It is to be appreciated, however, that the present invention may be implemented in a system which does not use dynamic buffer fragmentation, but rather uses a plurality of preset received buffers.

Following the buffer fragmentation and storage of the data, the host is issued an interrupt from controller 14 to check the buffer descriptor information and process any received data 86.

If in step 80 it is determined that there is an error in the data packet, the data packet status is marked as bad in step 88. The buffer fragment management 84 will note the status of the data packet as bad and processing of the data does not occur. Following step 86, the process reverts back to step 70 to continue the processing.

With more specific attention to the pre-parsing capabilities of DMA controller 14 generally set out in steps 80, 82, and 88, it is noted that control system A uses an intelligent multi-channel DMA controller 14 which will quickly and efficiently communicate with the System Media Access Controller (SMAC) communication channels. Since, host processor 10 has a very limited time available to respond to and service SMAC device interrupts for received information packets, DMA controller 14 is configured to not only buffer received data for host processor 10, but also to interpret and act on the status of received packets on behalf of host processor 10.

As noted, in previous control systems, host processor 10 is responsible for servicing all interrupts from receiving device, SMAC, 16. Although capable of being handled by host processor 10, the time required for the interrupt, processing interrupt and acknowledging the interrupt presented a severe burden on system operation to the point that the communication speed of the system degraded.

Figure 4:
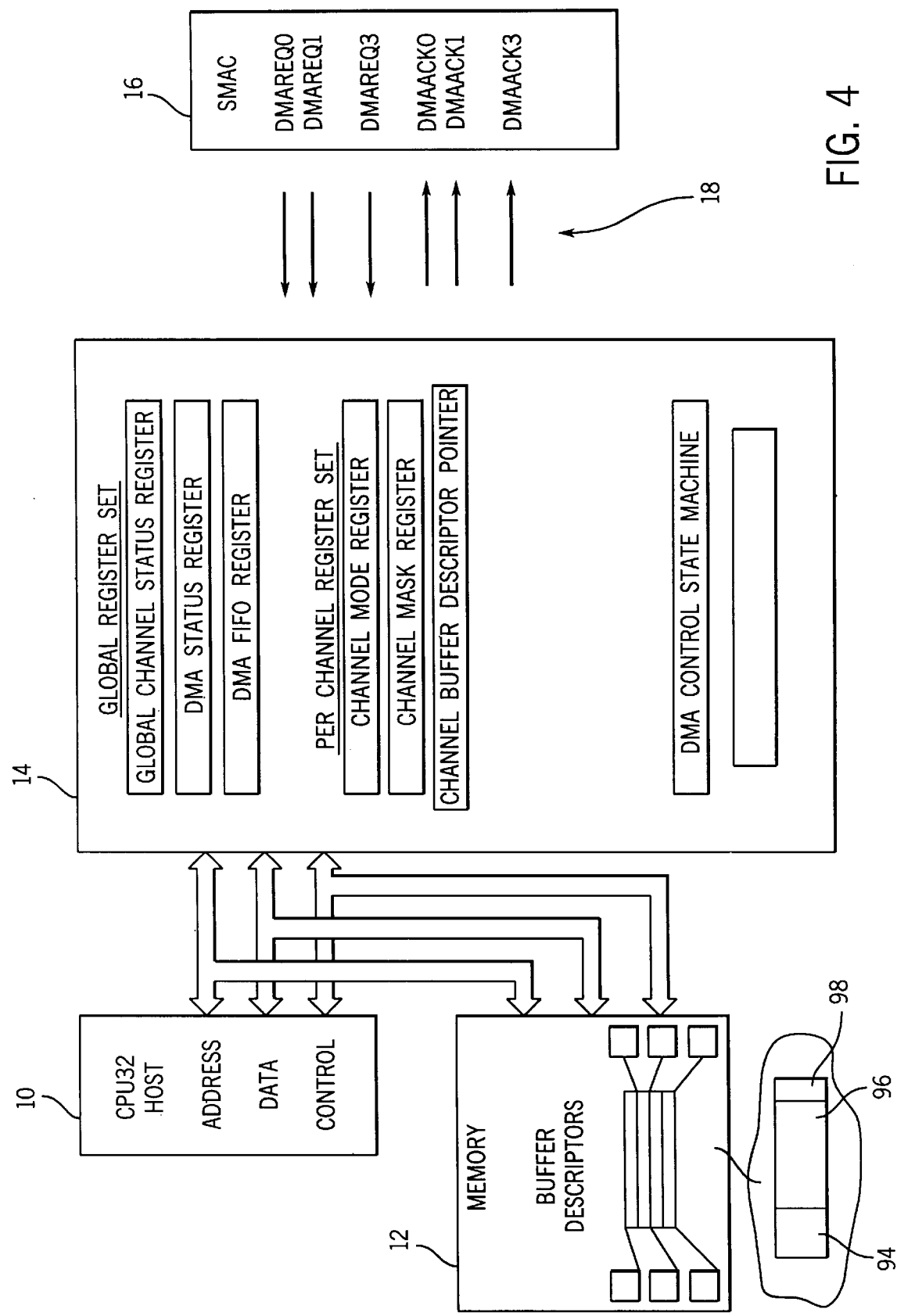
FIG. 4 is a block diagram of a DMA controller according to the subject invention.

Therefore, as illustrated in FIG. 4, DMA controller 14 is further configured with pre-parsing section 90. SMAC 16 interrupts DMA controller 14 having pre-parsing section 90 via frame complete interrupt 22 to indicate that no more received data is to be moved from SMAC 16. At this time DMA controller 14 interrogates SMAC 16 to determine the disposition of received packet 92. DMA controller 14 determines from the interrogation, whether the received packet contains an error, is valid, is a null packet or whether SMAC 16 requires attention from host processor 10. The interrogation may be done by known techniques, such as those employed when such interrogation was performed by the host in existing systems.

When DMA controller 14 detects an error in packet reception, controller 14 completes interrupt handshaking with SMAC 16. Data packet 92, which includes header information 94 and data 96, will then be marked at location 98 by DMA controller 14 by setting an appropriate flag inserting a bit pattern or some other known marking technique, whereafter data packet 92 and the status information is passed to host processor 10 via the buffer descriptor mechanism, described in connection with FIGS. 1B and 1C, and which is in place between DMA controller 14 and host processor 10.

In a situation where DMA controller 14 detects a null packet is received, DMA controller 14 completes interrupt handshaking with SMAC 16 and then simply waits for the next reception from SMAC 16. Under these conditions host processor 10 is not informed of this event, allowing host processor 10 time for other control and maintenance activities.

When a data packet received from SMAC 16 is determined by DMA controller 14 to be of a good frame status, DMA controller 14 completes the interrupt handshaking with SMAC 16 and then adds a marker at location 98 indicating the status. DMA controller 14 then updates the buffer descriptor mechanism which is in place between DMA controller 14 and host processor 10 and passes that information to host processor 10.

In another situation, when an interrupt is received from SMAC 16 that DMA controller 14 cannot support, host processor 10 is informed of the event. The host processor 10 is then responsible for interacting with SMAC 16 to complete any interrupt handshaking with SMAC 16, and a marker is supplied at location 98 to indicate the status of data packet 92.

Figure 5:
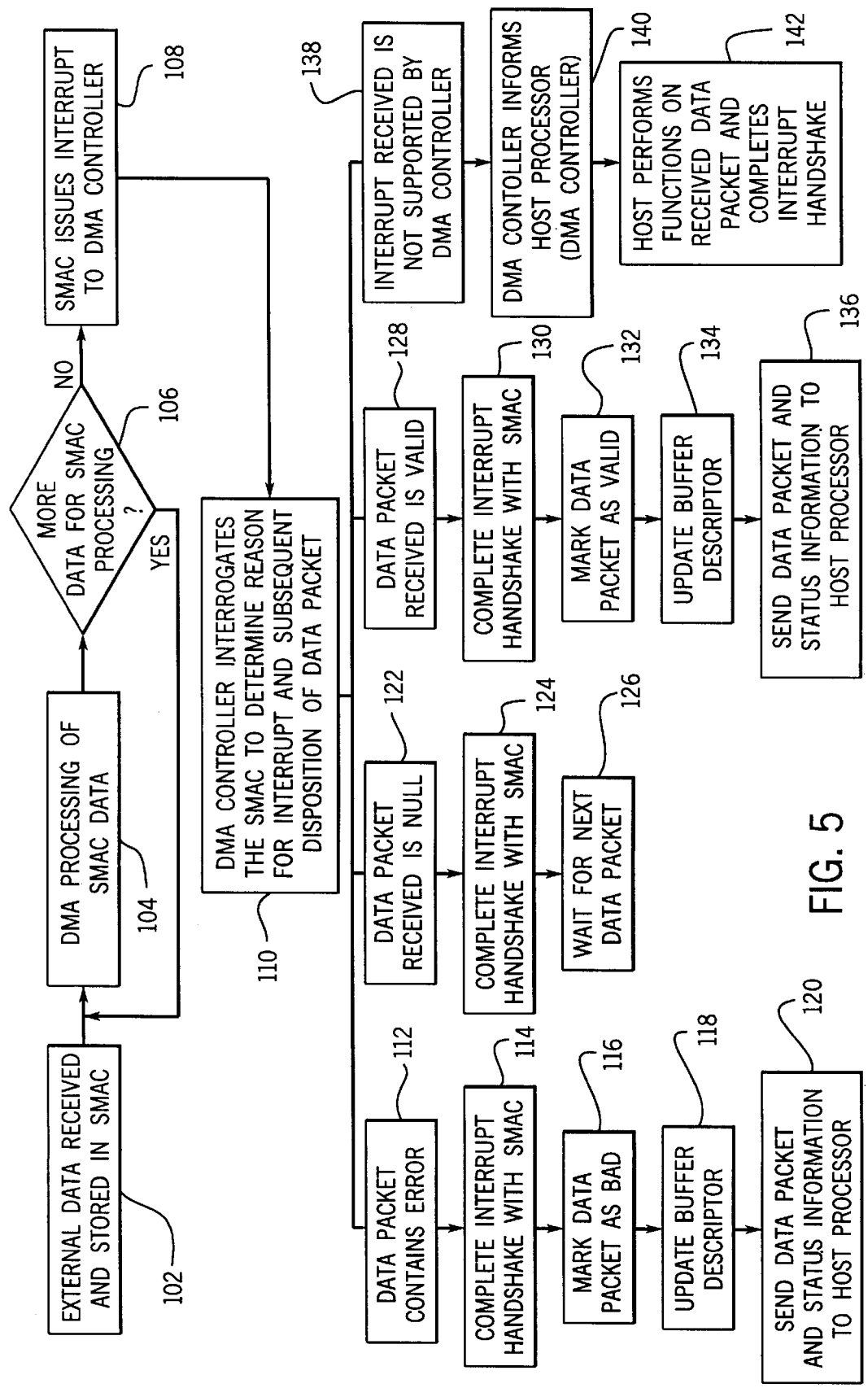
FIG. 5 is a flow chart more particularly setting out the pre-parsing actions of the subject invention.

The operational flow of the received packet pre-parsing by DMA controller 14 is illustrated in FIG. 5.

Initially, an external data packet is received and stored in SMAC 102. This data is transferred by DMA processing from the SMAC to system storage 104. It is then determined whether more data is to be transferred from the SMAC by DMA processing 106, if more data is to be transferred the process flows through step 104 back to 106. When it is determined no additional data is to be transferred, the SMAC issues an interrupt to the DMA controller indicating all data has been transferred 108. Upon receipt of this interrupt DMA controller interrogates the SMAC to determine the disposition of the data packet which has been received 110.

When the interrogation of step 110 determines a data packet contains an error, this information is provided to the pre-parsing section 112. Using this information, the DMA controller completes interrupt handshaking with the SMAC, marks the data packet as bad, updates the buffer descriptor and sends the data packet and status information to the host processor 114–120.

If the interrogation of the SMAC by the DMA Controller determines that the data packet is a null packet, this information is provided to the pre-parsing section 122. Based on this information, the DMA controller completes interrupt handshaking with the SMAC and the process enters a wait state for a next data packet 124–126. Under these conditions the host processor is not informed of this event, thereby freeing the host processor for other activities.

If it is determined by the DMA Controller interrogation that the data packet is valid, this information is passed to the pre-parsing section, whereafter handshaking is completed, the data packet is marked as valid, the buffer descriptor is updated, and the packet along with the status information is passed to host processor 130–136.

Lastly, when it is determined that the interrupt from the SMAC is not supported by the DMA controller 138, the DMA controller informs the host processor by a DMA interrupt 140 and the host processor functions to interact with the SMAC to complete handshaking 142.

Providing pre-parsing section 90 in DMA controller 14, data packet interrogation such as cyclic redundancy checking used to determine data packet status is removed from the responsibility of host processor 10 and is moved to DMA controller 14. Such an action frees up time for the host processor 10 to control other aspects of control system A. In this manner the host processor is only concerned with interrupts of this type definitely requiring host intervention.

We claim:

1. A method of transmitting data packets in a processor based control system wherein a host processor processes the data packets, the method comprising the steps of:

receiving and storing data from an external source in an external data receiving device;

issuing an interrupt signal from the external data receiving device to a DMA controller requesting movement of the data, formed as a data packet, from the external data receiving device to a system memory;

issuing a data transfer complete interrupt signal from the external data receiving device to the DMA controller indicating the data packet has been transferred;

pre-parsing, by the DMA controller, the received data packet prior to the data packet being processed by the host processor, the pre-processing including interrogating the external data receiving device, by the DMA controller, as to whether a received data packet contains an error, is valid, is a null packet or whether the external data receiving device requires attention from the host processor; and marking the moved data packet by the DMA controller dependent upon results of the interrogation of the data packet by the DMA controller, the marked data packet being provided at a location for processing by a host processor.

2. The method according to claim 1 wherein when the interrogation determines the data packet is valid, the method further comprises the steps of:

completing interrupt handshaking between the DMA controller and the external data receiving device;

marking the data packet as valid by the DMA controller;

updating a buffer descriptor which is in place between the DMA controller and the host processor; and passing information regarding the data packet from the DMA controller to the host processor.

3. The method according to claim 1 wherein when the interrogation determines the data packet contains an error, the method further comprises the steps of:

completing interrupt handshaking between the DMA controller and the external data receiving device;

marking the data packet as having an error by the DMA controller;

updating a buffer descriptor which is in place between DMA controller and the host processor; and passing information regarding the data packet from the DMA controller to the host processor.

4. The method according to claim 1 wherein when the interrogation determines the data packet is a null packet, the method further comprising the steps of:

completing interrupt handshaking between the DMA controller and the external receiving device; and entering a wait state for a next data packet.

5. The method according to claim 1 wherein when the signal issued from the external data receiving device to the DMA controller is not supported by the DMA controller, the method further comprising the steps of:

issuing a signal from the DMA controller to the host processor informing the host processor that the DMA controller does not support the interrupt from the external data receiving device;

causing the host processor to complete interrupt processing with the external data receiving device; and processing the data packet by the host processor.

6. A control system comprising:

an external data receiver device configured to receive and store, as a data packet, externally generated data and further configured to issue an interput signal;

a DMA controller configured to access the stored data from the external data receiver device based on the interrupt signal from the external data receiving device, the DMA controller further configured with a pre-parsing section used to act on a received data packet, prior to the data packet being processed by a host processor, the pre-parsing section including a means for interrogating the external data receiving device to determine if the data packet is a valid data packet, a data packet with an error, or a null packet the DMA controller further configured with a means for marking the received data packet in accordance with the interrogation; and a system memory configured to store the data packet from the external data receiver device.

7. The control system according to claim 6 wherein the system memory is further configured to provide access to the stored data packet by the host processor.

8. The control system according to claim 7 wherein the DMA controller is further configured to inform the host processor of interrupts the DMA controller is not capable of supporting.

9. The control system according to claim 6 further comprising:

a data request line configured to carry a DMA interrupt request from the external data receiving device, when the external data receiving device contains data on its internal buffer; and a frame complete interrupt line configured to carry a frame complete interrupt signal from the external data receiving device to indicate all data in the external data receiving device has been sent.

10. The control system according to claim 6 wherein the external data receiving device is a media access interface chip.

11. The control system according to claim 6 further including:
- an interrupt signal issuing means of the external data receiving device for issuing an interrupt signal to a DMA controller requesting movement of the data, formed as the data packet, from the external data receiving device to the system memory;
- a data transfer complete interrupt signal issuing means of the external data receiving device for issuing a data transfer complete interrupt signal to the DMA controller indicating the data packet has been transferred;
- an interrogation means of the DMA controller for interrogating the data packets; and
- a means for marking the received data packet by the DMA controller dependent upon the results of the interrogation.

12. The method according to claim 11 wherein the interrogation means includes means to determine whether the data packet is a valid data packet, a data packet with an error, or a null data packet.

13. An intelligent DMA controller comprising:
- a channel for receiving and transmitting data, in the form of a data packet, to and from the DMA controller;
- a plurality of internal control registers used to control the transmitting of the data packet through the data channel; and
- a pre-parsing section configured to determine the status of a received data packet prior to the data packet being processed by a host processor, the pre-parsing section including a means for interrogating an external data receiving device to determine if the data packet is a valid data packet, a data packet with an error, or a null packet, and means for marking the data packet in accordance with the interrogation.

14. The intelligent DMA controller according to claim 13 further including a plurality of data channels which receive and send data.

15. The intelligent DMA controller according to claim 14 including a plurality of internal registers which determine the configuration of the plurality of data channels.

16. The intelligent DMA controller according to claim 13 wherein the DMA controller is configured to receive a plurality of interrupt signals.

17. The intelligent DMA controller according to claim 13 further including means for determining receipt of an interrupt signal not supported by the DMA controller, and means for sending a message indicating such lack of support.

* * * * *